(12) United States Patent
Zhou et al.

(10) Patent No.: US 11,881,183 B2
(45) Date of Patent: Jan. 23, 2024

(54) OVERVOLTAGE PROTECTION CIRCUIT, OVERVOLTAGE PROTECTION DEVICE, DISPLAY PANEL AND DISPLAY

(71) Applicants: MIANYANG HKC OPTOELECTRONICS TECHNOLOGY CO., LTD., Mianyang (CN); HKC CORPORATION LIMITED, Shenzhen (CN)

(72) Inventors: Renjie Zhou, Mianyang (CN); Rongrong Li, Mianyang (CN)

(73) Assignees: MIANYANG HKC OPTOELECTRONICS TECHNOLOGY CO., LTD., Mianyang (CN); HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/069,854

(22) Filed: Dec. 21, 2022

(65) Prior Publication Data

US 2023/0245626 A1    Aug. 3, 2023

(30) Foreign Application Priority Data

Jan. 28, 2022 (CN) .......................... 202210105763.7

(51) Int. Cl.
G09G 3/34     (2006.01)
H02H 3/20     (2006.01)

(52) U.S. Cl.
CPC ............. *G09G 3/3406* (2013.01); *H02H 3/20* (2013.01); *G09G 2330/021* (2013.01); *G09G 2330/04* (2013.01)

(58) Field of Classification Search
CPC ............. G09G 3/3406; G09G 2330/04; G09G 2330/021; G09G 3/20; G09G 2330/028;
(Continued)

(56) References Cited

U.S. PATENT DOCUMENTS 3,814,987 A * 6/1974 Chacon .................. H02H 9/041
361/91.5
6,094,365 A * 7/2000 Chiao .................. H02H 7/1213
323/902
(Continued)

FOREIGN PATENT DOCUMENTS

CN         1862902 A     11/2006
CN       103095265 A      5/2013
(Continued)

OTHER PUBLICATIONS

Chen, Design of over voltage and over current protection switch chip based on BCD high voltage technology, Science and Technology Innovation, No. 19, pp. 7-9, dated Dec. 31, 2021.
(Continued)

*Primary Examiner* — Benyam Ketema
(74) *Attorney, Agent, or Firm* — Westbridge IP LLC

(57) ABSTRACT

Disclosed are an overvoltage protection circuit, a display panel and a display. The overvoltage protection circuit includes an overvoltage detection circuit and an overvoltage count circuit. The overvoltage detection circuit connected to a power supply and the overvoltage count circuit detects a power supply voltage output by the power supply and output an overvoltage signal to the overvoltage count circuit when the power supply voltage is in an overvoltage state. The overvoltage count circuit connected to a switching element outputs a cutoff signal to the switching element when accumulated times for receiving overvoltage signals reach preset times, to control the switching element to disconnect
(Continued)

the power supply from the power management integrated circuit.

14 Claims, 7 Drawing Sheets

(58) Field of Classification Search
CPC ...... G09G 2330/02; H02H 3/20; H02H 3/202; H02H 9/04; H02H 1/0007; G06F 1/30; G06F 1/28
See application file for complete search history.

(56) References Cited

U.S. PATENT DOCUMENTS

| | | | | |
|---|---|---|---|---|
| 6,127,879 | A * | 10/2000 | Willis | H02H 11/006 327/198 |
| 7,133,300 | B1 * | 11/2006 | Yang | H02H 7/122 363/21.13 |
| 7,773,394 | B2 * | 8/2010 | Shen | H02M 1/32 363/56.11 |
| 8,093,876 | B2 * | 1/2012 | Araki | H02M 1/32 323/283 |
| 8,634,176 | B2 * | 1/2014 | Brand | H02H 1/0069 361/119 |
| 8,743,523 | B2 * | 6/2014 | Acharya | H03K 17/081 361/111 |
| 9,263,937 | B2 * | 2/2016 | Nguyen | H02M 1/32 |
| 9,654,011 | B2 * | 5/2017 | Chen | H02H 3/027 |
| 2005/0068705 | A1 * | 3/2005 | Nakahara | H03K 17/0822 361/100 |
| 2005/0078424 | A1 * | 4/2005 | Yamamura | H02J 1/10 361/91.1 |
| 2006/0256590 | A1 * | 11/2006 | Yang | H02M 3/33507 363/56.11 |
| 2006/0261752 | A1 * | 11/2006 | Lee | H05B 45/54 315/291 |
| 2007/0014064 | A1 * | 1/2007 | Souma | H03K 17/0822 361/91.7 |
| 2007/0139837 | A1 * | 6/2007 | Usui | H02M 3/33523 361/91.1 |
| 2008/0094770 | A1 * | 4/2008 | Lee | H02H 3/087 361/93.1 |
| 2008/0204398 | A1 * | 8/2008 | Hwang | H05B 41/2824 315/294 |
| 2010/0263644 | A1 * | 10/2010 | Matsuda | F02P 9/005 123/625 |
| 2012/0249116 | A1 * | 10/2012 | Gagne | H02H 9/046 323/311 |
| 2013/0082667 | A1 * | 4/2013 | Sinreich | H02J 1/06 323/234 |
| 2014/0062326 | A1 * | 3/2014 | Ahn | G09G 3/3406 315/210 |
| 2014/0146426 | A1 | 5/2014 | Murakami | |
| 2020/0271279 | A1 * | 8/2020 | Xiong | H05B 45/10 |
| 2020/0344438 | A1 * | 10/2020 | Hu | H04N 5/63 |
| 2020/0358282 | A1 * | 11/2020 | Kutsukake | H02M 3/155 |
| 2020/0395754 | A1 * | 12/2020 | Tsai | H02J 1/06 |
| 2021/0004033 | A1 * | 1/2021 | Balasubramaniam | G05F 1/595 |
| 2021/0026270 | A1 * | 1/2021 | Ogawara | G03G 15/0258 |
| 2021/0029800 | A1 * | 1/2021 | Cheng | H05B 45/50 |
| 2022/0013055 | A1 * | 1/2022 | Hu | G09G 3/20 |
| 2023/0189849 | A1 * | 6/2023 | Ma | H05B 41/292 62/264 |

FOREIGN PATENT DOCUMENTS

| | | |
|---|---|---|
| CN | 109599842 A | 4/2019 |
| JP | 2014007809 A | 1/2014 |
| WO | 2007064062 A1 | 6/2007 |

OTHER PUBLICATIONS

Notification to Grant Patent Right for Invention issued in counterpart Chinese Patent Application No. 202210105763.7, dated Aug. 23, 2022.

* cited by examiner

OVERVOLTAGE PROTECTION CIRCUIT, OVERVOLTAGE PROTECTION DEVICE, DISPLAY PANEL AND DISPLAY

CROSS-REFERENCE TO RELATED APPLICATIONS

This application claims priority to Chinese Patent Application No. 202210105763.7, filed on Jan. 28, 2022, the entire contents of which are incorporated herein by reference.

TECHNICAL FIELD

The present disclosure relates to the technical field of displays, in particular to an overvoltage protection circuit, a display panel and a display.

BACKGROUND

In the display panel, the power management integrated circuit may be damaged when an input voltage of the power management integrated circuit is too high, thereby affecting the whole display panel to be used. The existing display panel usually has an overvoltage protection function, which protects the display panel every time an overvoltage occurs, leading to low use efficiency of the display panel. For example, when the display panel is protected in a very low overvoltage range or the display panel can withstand certain overvoltage times, the use efficiency of the display panel will be greatly affected due to a continuous overvoltage protection (stopping power supply) for the display panel. How to avoid unnecessary overvoltage protection or perform reasonable overvoltage protection for the display panel is an urgent problem to be solved.

The above content is only used to assist in understanding the technical solutions of the present disclosure, and does not mean that the above content is the prior art.

SUMMARY

The main objective of the present disclosure is to provide an overvoltage protection circuit, a display panel and a display, aiming to solve a technical problem that the display panel in an overvoltage state cannot be reasonably protected.

In order to achieve the above objectives, the present disclosure provides an overvoltage protection circuit connected to a power supply and a switching element provided between a power management integrated circuit and the power supply. The overvoltage protection circuit includes an overvoltage detection circuit and an overvoltage count circuit. The overvoltage detection circuit is connected to the power supply and the overvoltage count circuit, and the overvoltage count circuit is connected to the switching element. The overvoltage detection circuit is for detecting a power supply voltage output by the power supply and outputting an overvoltage signal to the overvoltage count circuit when the power supply voltage is in an overvoltage state, and the overvoltage count circuit is for outputting a cutoff signal to the switching element when accumulated times for receiving overvoltage signals reach preset times, to control the switching element to disconnect the power supply from the power management integrated circuit.

In an embodiment, the overvoltage detection circuit includes a voltage acquisition circuit and a voltage comparison circuit and the voltage acquisition circuit is respectively connected to the power supply and the voltage comparison circuit. The voltage comparison circuit is connected to the overvoltage count circuit. The voltage acquisition circuit is for acquiring the power supply voltage output by the power supply and outputting an acquired power supply voltage to the voltage comparison circuit, and the voltage comparison circuit is for comparing the power supply voltage with a reference voltage and outputting an overvoltage signal to the overvoltage count circuit when the power supply voltage is higher than the reference voltage.

In an embodiment, the voltage acquisition circuit includes a first metal oxide semiconductor (MOS) transistor and a first resistor. A gate of the first MOS transistor is connected to the power supply, and a drain of the first MOS transistor is respectively connected to a first end of the first resistor and the voltage comparison circuit. A second end of the first resistor is connected to a constant voltage power supply, and a source of the first MOS transistor is grounded.

In an embodiment, the voltage acquisition circuit further includes a second resistor, and a first end of the second resistor is connected to the power supply. A second end of the second resistor is connected to the gate of the first MOS transistor.

In an embodiment, the voltage comparison circuit includes a first comparator and a third resistor. A reverse input end of the first comparator is connected to the first end of the first resistor and the drain of the first MOS transistor. A forward input end of the first comparator is respectively connected to a reference voltage and a first end of the third resistor. An output end of the first comparator is connected to the overvoltage count circuit, and a second end of the third resistor is grounded.

In an embodiment, the overvoltage count circuit includes a preset number of T triggers and a preset number of inverters. A pulse input end of the T trigger is connected to the output end of the first comparator. A trigger input end of the T trigger is connected to an output end of the inverter corresponding to the trigger input end of the T trigger, and an output end of the T trigger is respectively connected to a control end of the switching element and an input end of the inverter.

In an embodiment, when a first overvoltage is protected, the overvoltage count circuit includes a T trigger. Both a pulse input end and a trigger input end of the T trigger are connected to the output end of the first comparator, and an output end of the T trigger is connected to a control end of the switching element.

In addition, in order to achieve the above objectives, the present disclosure further provides a display panel. The display panel includes a switching element, a power management integrated circuit and an overvoltage protection device. The overvoltage protection device includes an overvoltage protection circuit as mentioned above. The power management integrated circuit is connected to the power supply through the switching element, and the overvoltage protection device is respectively connected to the power supply and the switching element.

In addition, in order to achieve the above objectives, the present disclosure further provides a display. The display includes a backlight module and the display panel as mentioned above. The backlight module is provided on a back of the display panel for providing the display panel with a backlight light source.

The present disclosure provides an overvoltage protection circuit, a display panel and a display. The overvoltage protection circuit includes an overvoltage detection circuit and an overvoltage count circuit. The overvoltage detection circuit connected to the power supply and the overvoltage count circuit, is for detecting a power supply voltage output by the power supply and outputting an overvoltage signal to the overvoltage count circuit when the power supply voltage is in an overvoltage state. The overvoltage count circuit connected to the switching element is for outputting a cutoff signal to the switching element when accumulated times for receiving overvoltage signals reach preset times, to control the switching element to disconnect the power supply from the power management integrated circuit. In the present disclosure, the power supply voltage output by the power supply is detected, occurrence times of overvoltage signals are recorded when the power supply voltage is in an overvoltage state, and overvoltage protection is performed on the display panel when accumulated times reach preset times, thus the display panel can be reasonably protected.

BRIEF DESCRIPTION OF THE DRAWINGS

To illustrate the technical solutions according to the embodiments of the present disclosure or the related art more clearly, the accompanying drawings for describing the embodiments or the related art are introduced briefly in the following. Apparently, the accompanying drawings in the following description are only the drawings corresponding to embodiments of an array substrate, embodiments of a display panel and embodiments of a display in the present disclosure. Persons of ordinary skill in the art can derive other drawings from the accompanying drawings without creative efforts.

The realization of the objective, functional characteristics, and advantages of the present disclosure are further described with reference to the accompanying drawings.

DETAILED DESCRIPTION OF THE EMBODIMENTS

It should be understood that the specific embodiments described herein are only used to explain the present disclosure, and are not intended to limit the present disclosure.

The technical solutions of the embodiments of the present disclosure will be described in detail below with reference to the accompanying drawings.

Figure 1:
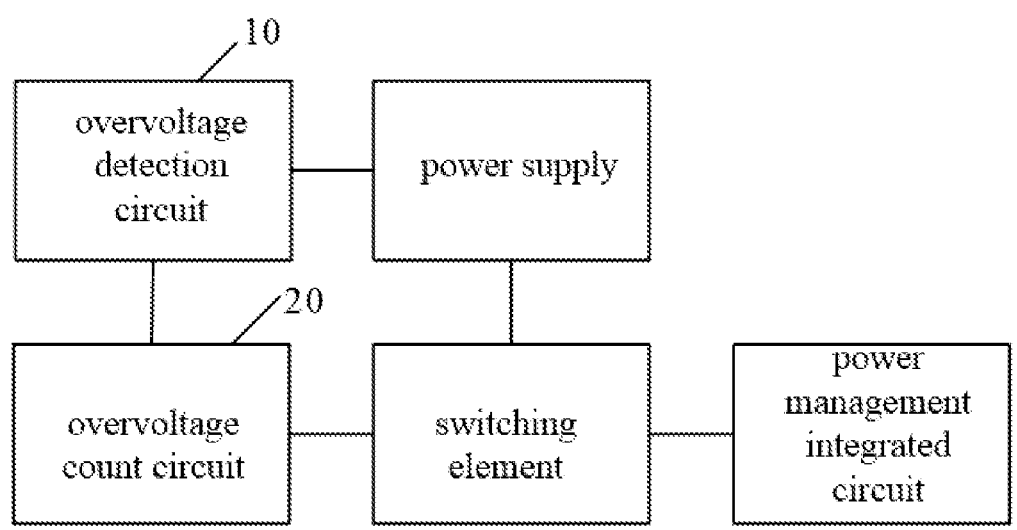
FIG. 1 is a schematic structural diagram of an overvoltage protection circuit according to an embodiment of the present disclosure.

As shown in FIG. 1, FIG. 1 is a schematic structural diagram of an overvoltage protection circuit according to an embodiment of the present disclosure.

In an embodiment, the overvoltage protection circuit is connected to a power supply VIN and a switching element provided between a power management integrated circuit and the power supply VIN. The overvoltage protection circuit includes an overvoltage detection circuit 10 and an overvoltage count circuit 20. The overvoltage detection circuit 10 is connected to the power supply VIN and the overvoltage count circuit 20, and the overvoltage count circuit 20 is connected to the switching element.

It should be noted that the overvoltage detection circuit 10 is a circuit which detects whether a power supply VIN voltage output by the power supply VIN is an overvoltage, and different detection results can be output by the overvoltage detection circuit 10 when the power supply VIN voltage output by the power supply VIN is in a normal state and in an abnormal state. The overvoltage count circuit 20 is a circuit for counting overvoltage times of the power supply VIN voltage output by the power supply VIN. The overvoltage count circuit 20 can be composed of an addition counter and related elements, and every time the power supply VIN voltage output by the power supply VIN is in an overvoltage state, the time counted by the overvoltage count circuit 20 will be automatically added once to realize an overvoltage count. The overvoltage count circuit 20 can further control the power supply VIN to stop outputting the power supply VIN voltage to the power management integrated circuit when accumulated overvoltage times reach certain times.

In an embodiment, the overvoltage detection circuit 10 not only can detect the power supply VIN voltage output by the power supply VIN in real time during the power supply VIN normally outputs the power supply VIN voltage to the power management integrated circuit, but also can output an overvoltage signal to the overvoltage count circuit 20 when the power supply VIN voltage is in an overvoltage state. The overvoltage count circuit 20 can continually receive the overvoltage signals. When accumulated times for receiving overvoltage signals reach preset times, the overvoltage count circuit 20 outputs a cutoff signal to the switching element to control the switching element to disconnect the power supply VIN from the power management integrated circuit. Thereby preventing the power supply VIN voltage which is in an overvoltage state for preset times from being input to the power management integrated circuit to protect the display panel 30.

The overvoltage state in which the power management integrated circuit may be damaged, is a state that the power supply VIN voltage output by the power supply VIN is higher than a voltage the power management integrated circuit can withstand. The overvoltage signal generated and output by the overvoltage detection circuit 10 when an overvoltage state is detected, is for indicating that the power supply VIN voltage currently output by the power supply VIN is in an overvoltage state. The preset times is preset for determining whether to activate the overvoltage protection. When the overvoltage times of the power supply VIN voltage output by the power supply VIN, namely the times for outputting overvoltage signals, reach the preset times, the overvoltage protection is activated. When the overvoltage times of the power supply VIN voltage output by the power supply VIN, namely the times for outputting overvoltage signals, do not reach the preset times, the power management integrated circuit and the display panel 30 which are in the overvoltage state that the overvoltage times is less than the preset times may not be damaged. Continuous overvoltage protection will greatly affect the use efficiency of the display panel 30, thus it is not necessary to activate the overvoltage protection for the time being.

In an embodiment of the present disclosure, the overvoltage protection circuit includes the overvoltage detection circuit 10 and the overvoltage count circuit 20. The overvoltage detection circuit 10 connected to the power supply VIN and the overvoltage count circuit 20, is for detecting a power supply VIN voltage output by the power supply VIN and outputting an overvoltage signal to the overvoltage count circuit 20 when the power supply VIN voltage is in an overvoltage state. The overvoltage count circuit 20 connected to the switching element is for outputting a cutoff signal to the switching element when the accumulated times for receiving overvoltage signals reach preset times, to control the switching element to disconnect the power supply VIN from the power management integrated circuit. In an embodiment, the power supply voltage output by the power supply is detected, occurrence times of overvoltage signals are recorded when the power supply voltage is in an overvoltage state, and overvoltage protection is performed on the display panel 30 when accumulated times reach preset times, thus the display panel 30 can be reasonably protected.

Figure 2:
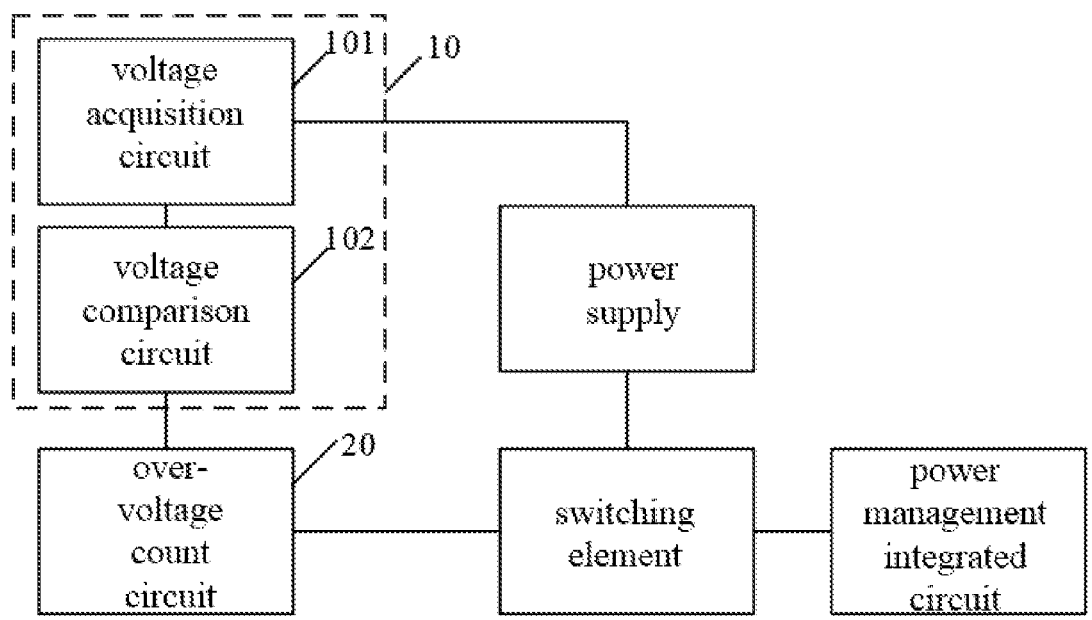
FIG. 2 is a schematic structural diagram of an overvoltage protection circuit according to another embodiment of the present disclosure.

As shown in FIG. 2, FIG. 2 is a schematic structural diagram of an overvoltage protection circuit according to another embodiment of the present disclosure. Based on FIG. 2 and the above-mentioned embodiment, an overvoltage protection circuit is provided in another embodiment of the present disclosure.

In an embodiment, the overvoltage protection circuit includes a voltage acquisition circuit 101 and a voltage comparison circuit 102. The voltage acquisition circuit 101 is respectively connected to the power supply VIN and the voltage comparison circuit 102, and the voltage comparison circuit 102 is connected to the overvoltage count circuit 20.

It should be noted that the voltage acquisition circuit 101 is for acquiring the power supply VIN voltage output by the power supply VIN, and the acquisition process can be performed in real time or at the same time interval, which is not limited in this embodiment. The voltage comparison circuit 102 is for comparing a reference voltage VR with the power supply VIN voltage output by the power supply VIN. The reference voltage VR is for judging whether the power supply VIN voltage output by the power supply VIN is an overvoltage. The voltage value of the reference voltage VR may be equal to the voltage value of the power supply VIN voltage output by the power supply VIN in a normal state or may be higher than the voltage value of the power supply VIN voltage in a normal state within a relatively small range. Of course, the voltage value of the reference voltage VR may also be lower than the voltage value of the power supply VIN voltage within a relatively small range. The specific voltage value of the reference voltage VR is determined by the specific connection between the reference voltage VR and the comparator and the specific connection between the power supply VIN voltage and the comparator in the voltage comparison circuit 102, which is not limited in this embodiment.

In an embodiment, the voltage acquisition circuit 101 can acquire the power supply VIN voltage output by the power supply VIN in real time and output an acquired power supply VIN voltage to the voltage comparison circuit 102. The voltage comparison circuit 102 can compare the acquired power supply VIN voltage with a reference voltage VR and output an overvoltage signal to the overvoltage count circuit 20 when the power supply VIN voltage is higher than the reference voltage VR.

Figure 3:
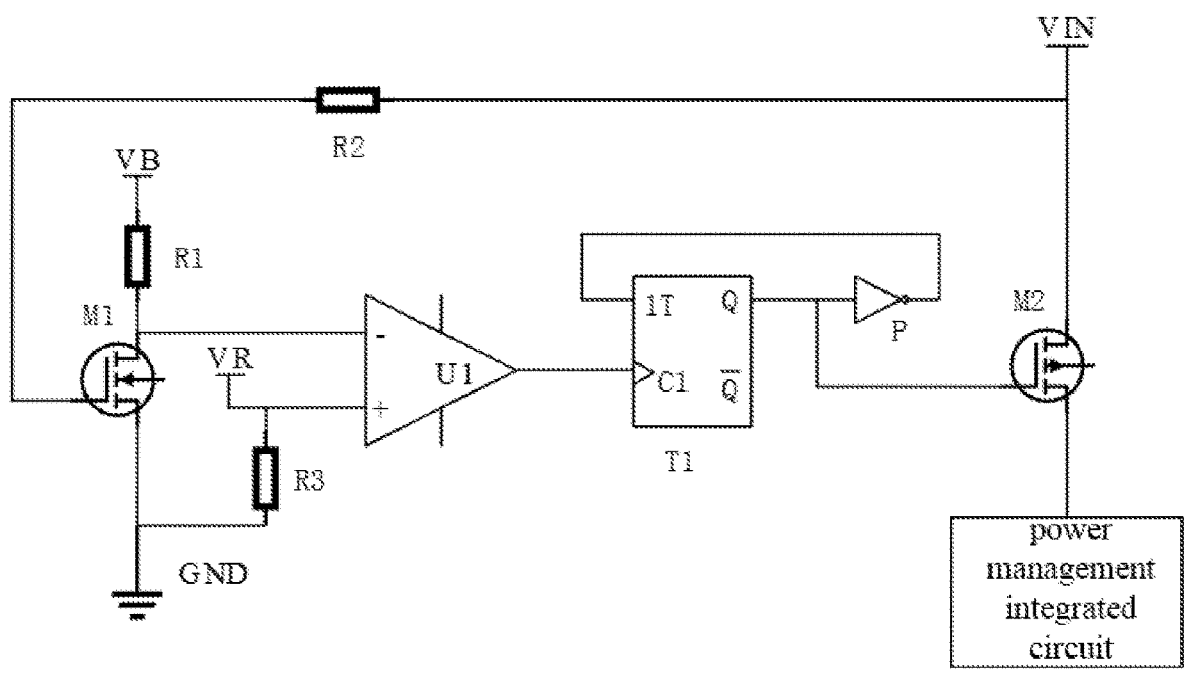
FIG. 3 is a first circuit structural diagram of the overvoltage protection circuit in FIG. 2.

As shown in FIG. 3, in another embodiment, the voltage acquisition circuit 101 comprises a first metal oxide semiconductor (MOS) transistor M1 and a first resistor R1. A gate of the first MOS transistor M1 is connected to the power supply VIN, and a drain of the first MOS transistor M1 is respectively connected to a first end of the first resistor R1 and the voltage comparison circuit 102. A second end of the first resistor R1 is connected to a constant voltage power supply VB, and a source of the first MOS transistor M1 is grounded GND.

The constant voltage power supply VB is a power supply VIN with a constant output voltage value. The first resistor R1 is a step-down resistor which steps down a voltage input from the constant voltage power supply VB to the voltage comparison circuit 102, thereby preventing elements in the voltage comparison circuit 102 from being damaged due to a too high voltage value output by the constant voltage power supply VB. The first MOS transistor M1 is a negative channel metal oxide semiconductor (NMOS) transistor with a variable resistance value, and due to the resistance value of the first MOS transistor M1 and the first resistor R1, a divided voltage circuit is formed to divide the voltage of the constant voltage power supply VB connected to the first MOS transistor M1 and the first resistor R1. The resistance value of the first MOS transistor M1 is related to the power supply VIN voltage output by the power supply VIN. The higher the voltage value of the power supply VIN voltage output by the power supply VIN, the lower the resistance value of the first MOS transistor M1, and in this case, the first MOS transistor M1 can be replaced by a variable resistor or other elements with the same function.

In an embodiment, a gate of the first MOS transistor M1 is connected to the power supply VIN. The first MOS transistor M1 is in an on state, and the voltage is divided between the first resistor R1 and the first MOS transistor M1. The voltage at the first end of the first resistor R1, namely, the voltage at the drain of the first MOS transistor M1, is input to the voltage comparison circuit 102. When the power supply VIN is in the overvoltage state, the power supply VIN voltage becomes higher, and the resistance value of the first MOS transistor M1 becomes lower, and the voltage value input to the voltage comparison circuit 102 after being divided by the first resistor R1 and the first MOS transistor M1 becomes lower. The lower voltage value and the reference voltage VR value are input into the first comparator U1 to generate a comparison result. By the first MOS transistor M1 and the first resistor R1, the constant voltage power supply VB in a normal state is stepped down to a lower voltage. The lower voltage value and the reference voltage VR value are input into the first comparator U1 to generate another comparison result, and the above two comparison results are not the same.

In an embodiment, the voltage acquisition circuit 101 further includes a second resistor R2. A first end of the second resistor R2 is connected to the power supply VIN, and a second end of the second resistor R2 is connected to the gate of the first MOS transistor M1.

It should be understood that the power supply VIN voltage value output by the power supply VIN may exceed the maximum voltage value that the gate of the first MOS transistor M1 can withstand, thereby damaging the first MOS transistor M1. In this case, the power supply VIN voltage output by the power supply VIN needs to be stepped down. In an embodiment, the power supply VIN voltage output by the power supply VIN is stepped down by the second resistor R2 and then input to the gate of the first MOS transistor M1, thereby avoiding damage to the first MOS transistor M1.

In an embodiment, the voltage comparison circuit 102 includes a first comparator U1 and a third resistor R3. A reverse input end of the first comparator U1 is connected to the first end of the first resistor R1 and the drain of the first MOS transistor M1, and a forward input end of the first comparator U1 is respectively connected to the reference voltage VR and a first end of the third resistor R3. An output end of the first comparator U1 is connected to the overvoltage count circuit 20, and a second end of the third resistor R3 is connected to ground GND.

It should be understood that, the first comparator U1 is for comparing the reference voltage VR with a voltage which is input to the first comparator U1 after the constant voltage power supply VB is divided. When the power supply VIN is in a normal state, the voltage of the constant voltage power supply VB which is input to the first comparator U1 after the constant voltage power supply VB is divided, is higher than the reference voltage VR and the first comparator U1 maintains the current output state. When the power supply VIN is in the overvoltage state, the output state of the first comparator U1 changes, that is, the first comparator U1 outputs an overvoltage signal.

Figure 4:
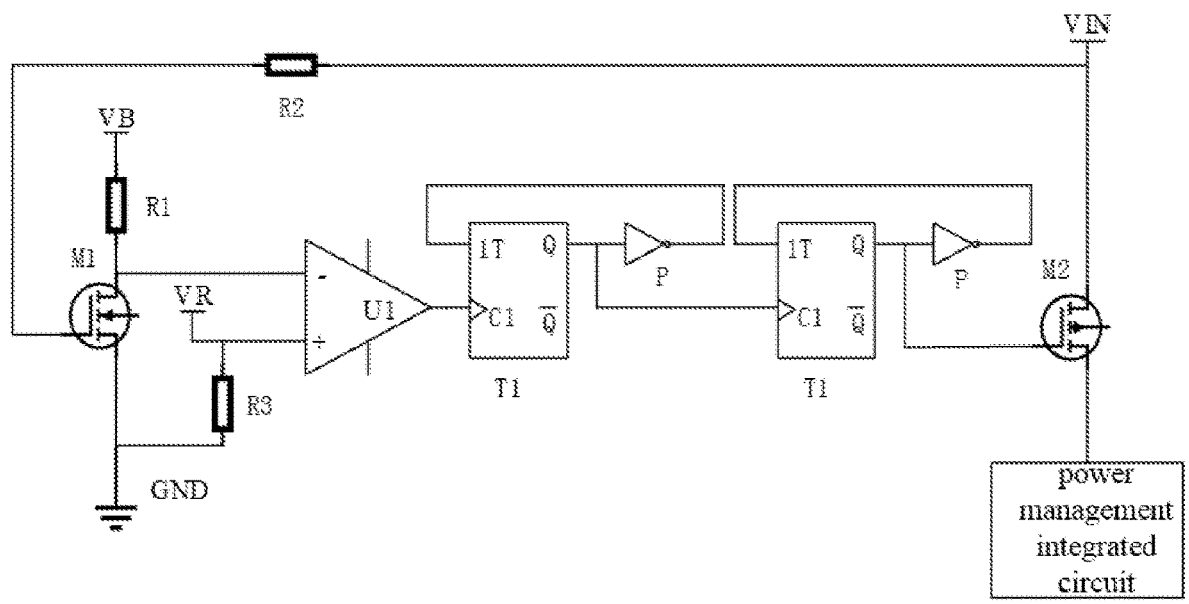
FIG. 4 is a second circuit structural diagram of the overvoltage protection circuit in FIG. 2.

As shown in FIG. 3 and FIG. 4, in another embodiment, the overvoltage count circuit 20 includes a preset number of T triggers T1 and a preset number of inverters P. A pulse input end C1 of the T trigger T1 is connected to the output end of the first comparator U1, and a trigger input end 1T of the T trigger T1 is connected to an output end of an inverter P corresponding to the trigger input end 1T of the T trigger T1. An output end Q of the T trigger T1 is respectively connected to a control end of the switching element and an input end of the inverter P.

It should be understood that, in an embodiment, the switching element may be provided with a control end, such as a MOS transistor, a triode, an insulated gate bipolar transistor (IGBT) and a magnetic switch. As shown in FIG. 3 and FIG. 4, a positive channel metal oxide semiconductor (PMOS) transistor is used as a switching element for description.

It should be noted that, the preset number set according to overvoltage times is a specific number for defining the T trigger T1 and the inverter P. For example, when the display panel 30 in a second overvoltage state needs to be protected, a T trigger T1 and an inverter P are provided with reference to FIG. 3. When the display panel 30 in a third overvoltage state needs to be protected, two T triggers T1 and two inverters P are provided with reference to FIG. 4. The preset number is determined by the occurrence times of overvoltage signals to be protected. For example, within a certain period of time, a display panel 30 of average quality can withstand overvoltage states for two times and maintain normal working state without damage to the display panel 30. When the overvoltage state occurs more than two times, a certain impact on the display panel 30 will be caused. In this case, an overvoltage protection is needed when a second overvoltage state occurs. As shown in FIG. 3, the display panel 30 in a second overvoltage state is protected by providing a T trigger T1 and an inverter P and setting the parameter of the T trigger T1. For another example, within a certain period of time, a display panel 30 of better quality can withstand the overvoltage states for three times and maintain normal working state without damage to the display panel 30. When the overvoltage state occurs more than three times, a certain impact on the display panel 30 will be caused. As shown in FIG. 4, the display panel 30 in a third overvoltage state is protected by providing two T triggers T1 and two inverters P.

It should be understood that, as shown in FIG. 3, by providing a T trigger T1 and an inverter P, an overvoltage protection can be performed every two overvoltage states. And as shown in FIG. 4, by providing two T triggers T1 and two inverters P, an overvoltage protection can be performed every three overvoltage states. Of course, when an overvoltage protection needs to be performed every four overvoltage states, three T triggers T1 and three inverters P can be provided, and when an overvoltage protection needs to be performed every five overvoltage states, four T triggers T1 and four inverters P can be provided. The number of T triggers T1 and inverters P is determined by the specific overvoltage protection times, which will not be repeated here.

In an embodiment, as shown in FIG. 3, an overvoltage protection is performed every two overvoltage signals. When the power supply VIN is in a first overvoltage state, the power supply VIN voltage is stepped down by the second resistor R2, and then is input to the gate of the first MOS transistor M1. The voltage of the first MOS transistor M1 is reduced and an output end of the first comparator U1 outputs a high level overvoltage signal to a pulse input end C1 of the T trigger T1. An initial state of a trigger input end 1T of the T trigger T1 is in a low level state, and an output end Q of the T trigger T1 maintains the low level state currently output. Due to the effect of the inverter P, the state of the trigger output end 1T switches from the low level state to the high level state, namely, 1T=1. When the second overvoltage state occurs, the pulse input end C1 is in the high level state for the second time, and the trigger input end 1T is in a high level state. The output end Q of the T trigger T1 outputs a high level to the gate of the second MOS M2 and controls the second MOS M2 to be in an off state, thereby realizing a purpose that the display panel 30 in the first overvoltage state is not protected, and the display panel 30 in the second overvoltage state is protected.

In addition, as shown in FIG. 4, an overvoltage protection is performed every three overvoltage signals. When the power supply VIN is in a first overvoltage state, the power supply VIN voltage is stepped down by the second resistor R2, and then is input to the gate of the first MOS transistor M1. The voltage of the first MOS transistor M1 is reduced and an output end of the first comparator U1 outputs a high level overvoltage signal to a pulse input end C1 of the T trigger T1. Each initial state of two trigger input ends 1T of two T triggers T1 is in a low level state, and each output end Q of two T triggers T1 maintains the low level state currently output. Due to the effect of the inverter P, the state of the trigger output end 1T is switched from the low level state to the high level state, namely, 1T=1. When the second overvoltage state occurs, the pulse input end C1 is in the high level state for the second time, and the trigger input end 1T is in a high level state. And the output end Q of the T trigger T1 outputs a high level to the pulse input end C1 of the second T trigger T1 to make the pulse input end C1 of the second T trigger T1 in a high level state for the first time. The trigger input end 1T of the second T trigger T1 is in the low level state, thus the output end Q of the second T trigger T1 maintains the current low level state. When the overvoltage signal occurs for the third time, the output end Q of the first T trigger T1 maintains a high level state. The trigger input end 1T of the first T trigger T1 switches to a high level state, and the pulse input end C1 of the second T trigger T1 receives a high level signal for the second time. Due to the trigger input end 1T of the second T trigger T1 is in the high level state, the output end Q of the second T trigger T1 inverts and outputs a high level signal to the gate of the second MOS M2 to control the second MOS M2 to be in an off state, thereby realizing a purpose that the display panel 30 in the first overvoltage state and the second overvoltage state is not protected, and the display panel 30 in the third overvoltage state is protected.

Figure 5:
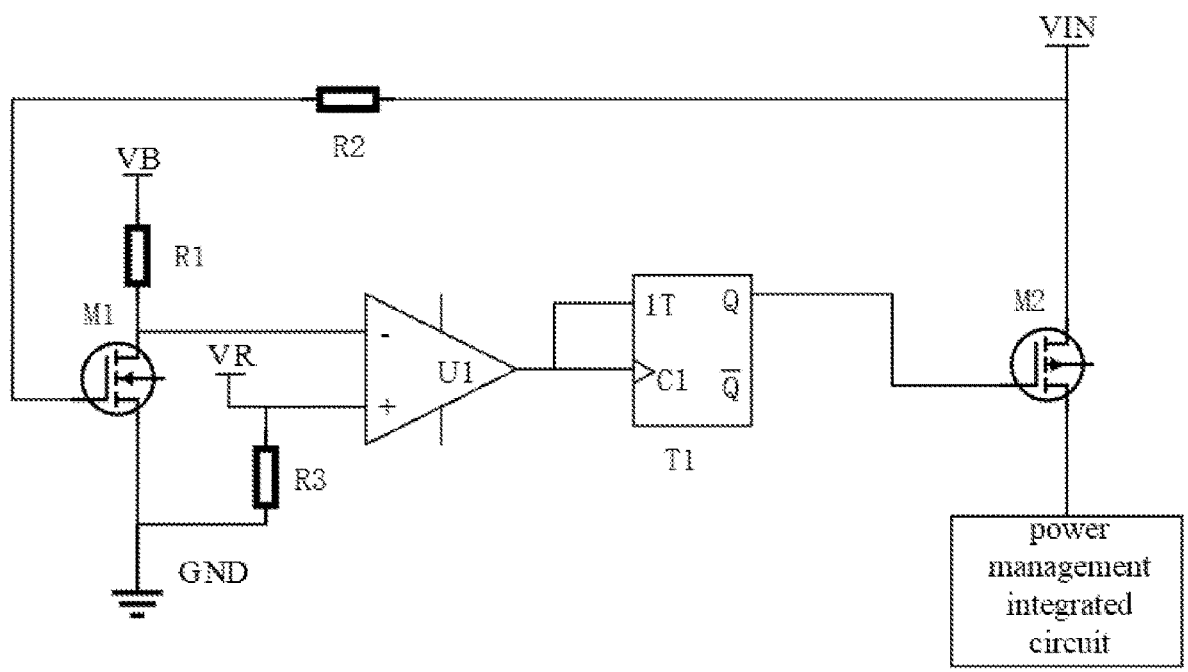
FIG. 5 is a third circuit structural diagram of the overvoltage protection circuit in FIG. 2.

As shown in FIG. 5, in an embodiment, when the display panel 30 in a first overvoltage is protected, the overvoltage count circuit 20 includes a T trigger T1. Both a pulse input end C1 and a trigger input end 1T of the T trigger T1 are connected to the output end of the first comparator U1 and an output end Q of the T trigger T1 is connected to a control end of the switching element.

It should be understood that, when the overvoltage protection is performed every an overvoltage state, the trigger input end 1T of the T trigger T1 should maintain a high level state or the pulse input end C1 and the trigger input end 1T should be both in a high level state at the same time.

In an embodiment, as shown in FIG. 5, an initial state of the output end Q of the T trigger T1 is to output a low level signal to make the second MOS M2 in an on state. The power supply VIN can supply power for the power management integrated circuit through the second MOS M2. Every time the power supply VIN is in an overvoltage state, the power supply VIN voltage is stepped down by the second resistor R2, and then is input to the gate of the first MOS transistor M1. The voltage of the first MOS transistor M1 is reduced, and the output end of the first comparator U1 outputs a high level overvoltage signal to the pulse input end C1 and the trigger input end 1T of the T trigger T1. Due to the trigger input end 1T of the T trigger T1 is in the high level state, the output end Q of the T trigger T1 inverts and outputs a high level signal to the gate of the second MOS M2 to control the second MOS M2 to be in the off state, thereby protecting the display panel 30 in every overvoltage state.

In an embodiment, by providing a preset number of T triggers T1 and a preset number of inverters P, when the accumulated times for receiving overvoltage signals reach the preset times, an overvoltage protection for the display panel 30 is realized, and the accumulated times for receiving overvoltage signals can be more accurately specified to the overvoltage times. Thereby more reasonably avoiding unnecessary overvoltage protections and achieving reasonable protection for the display panel 30.

In addition, the present disclosure further provides an overvoltage protection device including the above-mentioned overvoltage protection circuit. Since the overvoltage protection device adopts all the technical solutions of all the above-mentioned embodiments, it has at least all the beneficial effects brought by the technical solutions of the above-mentioned embodiments, which will not be repeated here.

Figure 6:
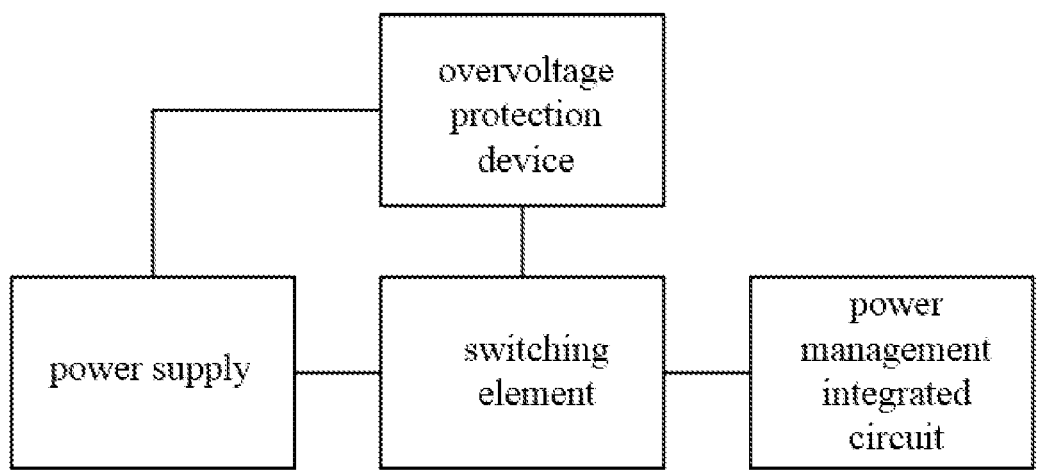
FIG. 6 is a schematic structural diagram of a display panel according to an embodiment of the present disclosure.

In addition, the present disclosure further provides a display panel 30. As shown in FIG. 6, FIG. 6 is a schematic structural diagram of a display panel 30 according to an embodiment of the present disclosure. The display panel 30 includes a switching element, a power management integrated circuit and an overvoltage protection device as mentioned above. The power management integrated circuit is connected to a power supply VIN through the switching element, and the overvoltage protection device is respectively connected to the power supply VIN and the switching element.

Figure 7:
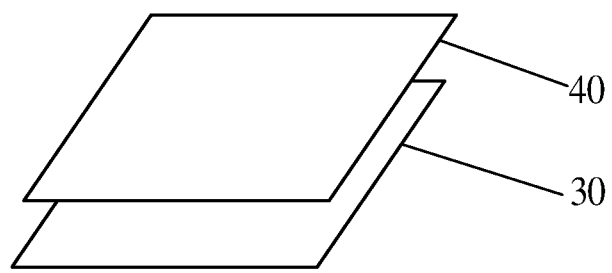
FIG. 7 is a schematic structural diagram of a display according to an embodiment of the present disclosure.

In addition, the present disclosure further provides a display. As shown in FIG. 7, FIG. 7 is a schematic structural diagram of a display according to an embodiment of the present disclosure. The display includes a backlight module 40 and a display panel 30 as mentioned above. The backlight module 40 is provided on a back of the display panel 30 for providing the display panel 30 with a backlight light source.

The above are only preferred embodiments of the present disclosure and are not to limit the scope of the present disclosure. Any equivalent structure or equivalent process transformation made by using the contents of the description and drawings of the present disclosure, directly or indirectly applied in other related technical fields, shall fall within the claimed scope of the present disclosure.

It is obvious that the embodiments described are only some rather than all of the embodiments of the present disclosure. All other embodiments obtained by those skilled in the art based on the embodiments of the present disclosure without creative efforts shall fall within the claimed scope of the present disclosure.

It should be noted that all the directional indications (such as up, down, left, right, front, rear) in the embodiments of the present disclosure are only used to explain the relative positional relationship, movement, or the like of the components in a certain posture (as shown in the drawings). If the specific posture changes, the directional indication will change accordingly.

Besides, the descriptions associated with, e.g., "first" and "second," in the present disclosure are merely for descriptive purposes, and cannot be understood as indicating or suggesting relative importance or impliedly indicating the number of the indicated technical feature. Therefore, the feature associated with "first" or "second" can expressly or impliedly include at least one such feature. In addition, the technical solutions of the various embodiments can be combined with each other, but the combinations must be based on the realization of those skilled in the art. When the combination of technical solutions is contradictory or cannot be achieved, it should be considered that such a combination of technical solutions does not exist, nor does it fall within the scope of the present disclosure.

What is claimed is:

1. An overvoltage protection circuit, connected to a power supply and a switching element provided between a power management integrated circuit and the power supply, comprising:
    an overvoltage detection circuit; and
    an overvoltage count circuit,
    wherein:
    the overvoltage detection circuit is connected to the power supply and the overvoltage count circuit, and the overvoltage count circuit is connected to the switching element;
    the overvoltage detection circuit is for detecting a power supply voltage output by the power supply and outputting an overvoltage signal to the overvoltage count circuit when the power supply voltage is in an overvoltage state; and
    the overvoltage count circuit is for outputting a cutoff signal to the switching element when accumulated times for receiving overvoltage signals reach preset times, to control the switching element to disconnect the power supply from the power management integrated circuit.

2. The overvoltage protection circuit of claim 1, wherein:
    the overvoltage state is a state that the power supply voltage output by the power supply is higher than a voltage the power management integrated circuit can withstand;
    the overvoltage signal is generated and output by the overvoltage detection circuit when an overvoltage state is detected; and
    the preset times is preset for determining whether to activate an overvoltage protection.

3. The overvoltage protection circuit of claim 1, wherein:
the overvoltage detection circuit comprises a voltage acquisition circuit and a voltage comparison circuit; and
the voltage acquisition circuit is respectively connected to the power supply and the voltage comparison circuit, and the voltage comparison circuit is connected to the overvoltage count circuit.

4. The overvoltage protection circuit of claim 3, wherein:
the voltage acquisition circuit is for acquiring the power supply voltage output by the power supply and outputting an acquired power supply voltage to the voltage comparison circuit; and
the voltage comparison circuit is for comparing the power supply voltage with a reference voltage and outputting an overvoltage signal to the overvoltage count circuit when the power supply voltage is higher than the reference voltage.

5. The overvoltage protection circuit of claim 4, wherein the voltage acquisition circuit acquires the power supply voltage output by the power supply at a same time interval, and a voltage value of the reference voltage is equal to a voltage value of the power supply voltage output by the power supply in a normal state.

6. The overvoltage protection circuit of claim 3, wherein:
the voltage acquisition circuit comprises a first metal oxide semiconductor (MOS) transistor and a first resistor;
a gate of the first MOS transistor is connected to the power supply, and a drain of the first MOS transistor is respectively connected to a first end of the first resistor and the voltage comparison circuit; and
a second end of the first resistor is connected to a constant voltage power supply, and a source of the first MOS transistor is grounded.

7. The overvoltage protection circuit of claim 6, wherein:
the constant voltage power supply is a power supply with a constant output voltage value;
the first resistor is a step-down resistor; and
the first MOS transistor is a negative channel metal oxide semiconductor (NMOS) transistor with a variable resistance value.

8. The overvoltage protection circuit of claim 7, wherein:
the voltage acquisition circuit further comprises a second resistor; and
a first end of the second resistor is connected to the power supply, and a second end of the second resistor is connected to the gate of the first MOS transistor.

9. The overvoltage protection circuit of claim 8, wherein:
the voltage comparison circuit comprises a first comparator and a third resistor;
a reverse input end of the first comparator is connected to the first end of the first resistor and the drain of the first MOS transistor;
a forward input end of the first comparator is respectively connected to a reference voltage and a first end of the third resistor; and
an output end of the first comparator is connected to the overvoltage count circuit, and a second end of the third resistor is grounded.

10. The overvoltage protection circuit of claim 9, wherein the first comparator is for comparing the reference voltage with a voltage input from the constant voltage power supply to the first comparator.

11. The overvoltage protection circuit of claim 10, wherein:
the overvoltage count circuit comprises a preset number of T triggers and a preset number of inverters;
a pulse input end of the T trigger is connected to the output end of the first comparator;
a trigger input end of the T trigger is connected to an output end of the inverter corresponding to the trigger input end of the T trigger; and
an output end of the T trigger is respectively connected to a control end of the switching element and an input end of the inverter.

12. The overvoltage protection circuit of claim 10, wherein:
when a first overvoltage is protected, the overvoltage count circuit comprises a T trigger;
both a pulse input end and a trigger input end of the T trigger are connected to the output end of the first comparator; and
an output end of the T trigger is connected to a control end of the switching element.

13. A display panel, comprising a switching element, a power management integrated circuit and an overvoltage protection device, wherein:
the overvoltage protection device comprises an overvoltage protection circuit connected to a power supply and a switching element provided between a power management integrated circuit and the power supply, wherein:
the overvoltage protection circuit comprises an overvoltage detection circuit and an overvoltage count circuit;
the overvoltage detection circuit is connected to the power supply and the overvoltage count circuit, and the overvoltage count circuit is connected to the switching element;
the overvoltage detection circuit is for detecting a power supply voltage output by the power supply and outputting an overvoltage signal to the overvoltage count circuit when the power supply voltage is in an overvoltage state; and
the overvoltage count circuit is for outputting a cutoff signal to the switching element when accumulated times for receiving overvoltage signals reach preset times, to control the switching element to disconnect the power supply from the power management integrated circuit; and
the power management integrated circuit is connected to the power supply through the switching element, and the overvoltage protection device is respectively connected to the power supply and the switching element.

14. A display, comprising a backlight module and a display panel, wherein:
the display panel comprises a switching element, a power management integrated circuit and an overvoltage protection device, wherein:
the overvoltage protection device comprises an overvoltage protection circuit connected to a power supply and a switching element provided between a power management integrated circuit and the power supply, wherein:
the overvoltage protection circuit comprises an overvoltage detection circuit and an overvoltage count circuit;
the overvoltage detection circuit is connected to the power supply and the overvoltage count circuit, and the overvoltage count circuit is connected to the switching element;

the overvoltage detection circuit is for detecting a power supply voltage output by the power supply and outputting an overvoltage signal to the overvoltage count circuit when the power supply voltage is in an overvoltage state; and the overvoltage count circuit is for outputting a cutoff signal to the switching element when accumulated times for receiving overvoltage signals reach preset times, to control the switching element to disconnect the power supply from the power management integrated circuit; and the power management integrated circuit is connected to the power supply through the switching element, and the overvoltage protection device is respectively connected to the power supply and the switching element; and the backlight module is provided on a back of the display panel for providing the display panel with a backlight light source.

* * * * *